(12) United States Patent
Anderson et al.

(10) Patent No.: US 7,394,738 B2
(45) Date of Patent: *Jul. 1, 2008

(54) IDENTIFYING OPTICAL DISC PROPERTIES FROM INFORMATION READ FROM LABEL SIDE OF OPTICAL DISC

(75) Inventors: Daryl E. Anderson, Corvallis, OR (US); David M. Kwasny, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 723 days.

This patent is subject to a terminal disclaimer.

(21) Appl. No.: 10/103,043

(22) Filed: Mar. 20, 2002

(65) Prior Publication Data

US 2003/0179674 A1 Sep. 25, 2003

(51) Int. Cl.
*G11B 7/00* (2006.01)
(52) U.S. Cl. .............................. 369/53.21; 369/53.22
(58) Field of Classification Search .............. 369/30.36, 369/52.1, 53.22, 53.37, 53.21, 273; 720/729
See application file for complete search history.

(56) References Cited

U.S. PATENT DOCUMENTS

| | | | | |
|---|---|---|---|---|
| 4,751,394 A | * | 6/1988 | Matsuoka et al. | 250/559.29 |
| 4,766,502 A | * | 8/1988 | Mashimo | 386/15 |
| 4,961,077 A | * | 10/1990 | Wilson et al. | 347/262 |
| 5,042,020 A | * | 8/1991 | Endo | 369/44.31 |
| 5,144,117 A | | 9/1992 | Hasegawa et al. | 235/455 |
| 5,189,290 A | * | 2/1993 | Tsutsui | 235/454 |
| 5,243,495 A | | 9/1993 | Read et al. | 361/685 |
| 5,289,451 A | * | 2/1994 | Ashinuma et al. | 369/47.55 |
| 5,485,439 A | * | 1/1996 | Hamasaka et al. | 369/47.36 |
| 5,684,771 A | | 11/1997 | Furukawa et al. | 369/58 |
| 5,706,047 A | * | 1/1998 | Lentz et al. | 347/262 |
| 5,729,464 A | | 3/1998 | Dimitri | |
| 5,729,533 A | * | 3/1998 | Marquardt | 369/273 |
| 5,917,791 A | | 6/1999 | Tsuchiya et al. | 369/58 |
| 6,097,683 A | * | 8/2000 | Ohara et al. | 369/53.22 |
| 6,128,388 A | | 10/2000 | Gotoh et al. | |
| 6,160,770 A | * | 12/2000 | Ohara et al. | 369/47.55 |
| 6,295,262 B1 | * | 9/2001 | Kusumoto et al. | 369/53.37 |
| 6,633,853 B2 | * | 10/2003 | Oshima et al. | 705/57 |
| 6,724,693 B1 | * | 4/2004 | Kutaragi et al. | 369/13.02 |
| 6,881,949 B2 | * | 4/2005 | Spencer | 250/231.13 |

(Continued)

FOREIGN PATENT DOCUMENTS

EP 0 478 201 4/1990

(Continued)

OTHER PUBLICATIONS

American Heritage College Dictionary, The, 2002, Houghton Mifflin Company, Fourth Edition, p. 706.*

(Continued)

*Primary Examiner*—Wayne Young
*Assistant Examiner*—Adam R Giesy (57) ABSTRACT

Identifying optical disc properties from information read from the label side of an optical disc is disclosed. The information from the label side of an optical disc is first read. From this information read from the label side of the optical disc, one or more properties of the optical disc are then identified.

14 Claims, 8 Drawing Sheets

U.S. PATENT DOCUMENTS

| | | | |
|---|---|---|---|
| 6,885,627 B1 * | 4/2005 | Taugher | 369/275.2 |
| 7,187,637 B2 * | 3/2007 | Pate et al. | 369/53.21 |
| 2001/0026531 A1 | 10/2001 | Onodera et al. | |
| 2002/0046177 A1 | 4/2002 | Oshima et al. | |
| 2002/0049678 A1 * | 4/2002 | Oshima et al. | 705/51 |
| 2003/0107959 A1 * | 6/2003 | Norton et al. | 369/30.23 |
| 2003/0147339 A1 * | 8/2003 | Selinfreund et al. | 369/275.3 |

FOREIGN PATENT DOCUMENTS

| | | |
|---|---|---|
| EP | 0 833 335 | 4/1998 |
| EP | 1 150 281 | 10/2001 |
| EP | 1485917 | 3/2006 |

OTHER PUBLICATIONS

International Search Report for Malaysian patent app. No. PI 20031175, Hewlett Packard (1 page).

* cited by examiner

IDENTIFYING OPTICAL DISC PROPERTIES FROM INFORMATION READ FROM LABEL SIDE OF OPTICAL DISC

BACKGROUND OF THE INVENTION

Computer users employ writable and rewritable optical discs for a variety of different purposes. They may save programs or data to the discs, for archival or distribution purposes. In the case of CD-type discs, users may make music CD's that can be played in audio CD players, or save music data files to the CD's, such as MP3 files, that can be played in special-purpose CD players. In the case of DVD-type discs, users have greater storage capacity available to them than with CD-type discs, and may be able to make video DVD's that can be played in stand-alone DVD players.

Many types of optical discs include a data side and a label side. The data side is where the data is written to, whereas the label side allows the user to label the optical disc. Unfortunately, labeling can be an unprofessional, laborious, and/or expensive process. Markers can be used to write on optical discs, but the results are decidedly unprofessional looking. Special pre-cut labels that can be printed on with inkjet or other types of printers can also be used. However, this is a laborious process: the labels must be carefully aligned on the discs, and so on. Special-purpose printers that print directly on the discs can be used, but such printers are fairly expensive.

In the patent application entitled "Integrated CD/DVD Recording and Label", filed on Oct. 11, 2001, and assigned Ser. No. 09/976,877, a solution to these difficulties is described, in which a laser is used to label optical discs. However, the user may place the optical disc incorrectly in the computer peripheral, such that the laser may try to write on the wrong (data) side of the optical disc. A disk that cannot be labeled may be inadvertently inserted in the labeling peripheral. Furthermore, different techniques may be used to optimally label different types of optical discs, but the user may not know the specific type of optical disc he or she has.

SUMMARY OF THE INVENTION

A method of one embodiment of the invention reads information from the label side of an optical disc. From this information read from the label side of the optical disc, one or more properties of the optical disc are then identified. Still other aspects, embodiments, and advantages of the invention will become apparent by reading the detailed description that follows, and by referring to the accompanying drawings.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Indicia Embodiment

Figure 1:
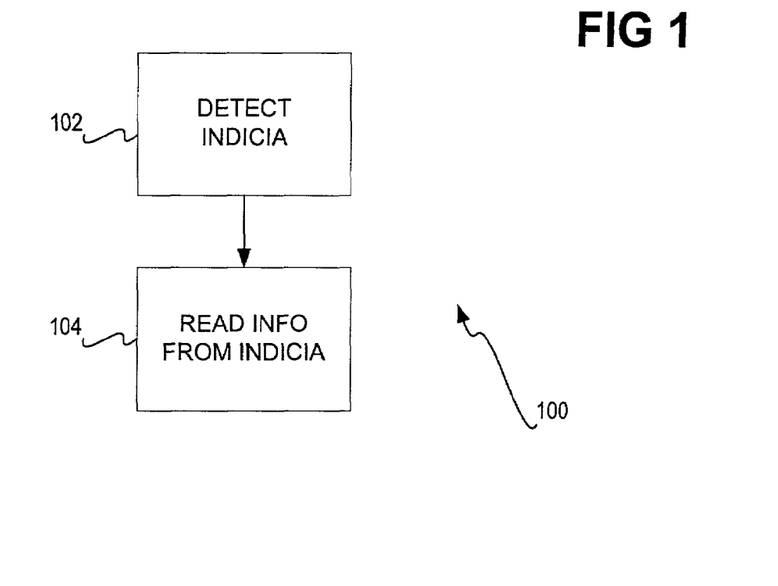
FIG. 1 is a flowchart of a method according to an indicia embodiment of the invention.

FIG. 1 shows a method 100 according to an indicia embodiment of the invention. An indicia on a side of an optical disc presumed to be the label side of the optical disc is first detected (102). The optical disc may be a CD-type optical medium, a DVD-type optical medium, or another type of optical medium. The label side is the side of the optical disc on which marking or imaging can occur. In the context of CD-type optical media, it is typically opposite the data side, whereas in the context of DVD-type optical media, it may be opposite the data side, or included as part of the data side. The indicia may be detected by moving a laser radially across a position on the side of the optical disc, as the optical disc rotates, where the indicia is located at this position. That is, the indicia may be located at a stationary radius position on the optical disc, and the laser detects the indicia by moving radially until it locates the indicia, and then does not move radially any longer. The indicia may not be detected if it is not present on the label side of the optical disc, or if the data side of the optical disc is improperly facing the laser.

However, where the indicia is detected, information from the optical disc is read from the indicia (104). Reading this information can include identifying properties of either the label side of the optical disc, the data side of the optical disc, or both. For instance, the type of optical disc, including the type of the label side of the optical disc, may be identified, so that optimal writing to the label side of the optical disc can occur. Whether the label side and/or the data side of the optical disc is write protected may be identified. Specifications regarding the laser for optimal writing to the label side of the disc may also be identified. Such specifications can include the intensity at which the laser should be turned on for optimal writing, the duration of time at which the laser should be turned on at a given point on the label side of the disc, and the velocity maintained during writing.

Figure 2:
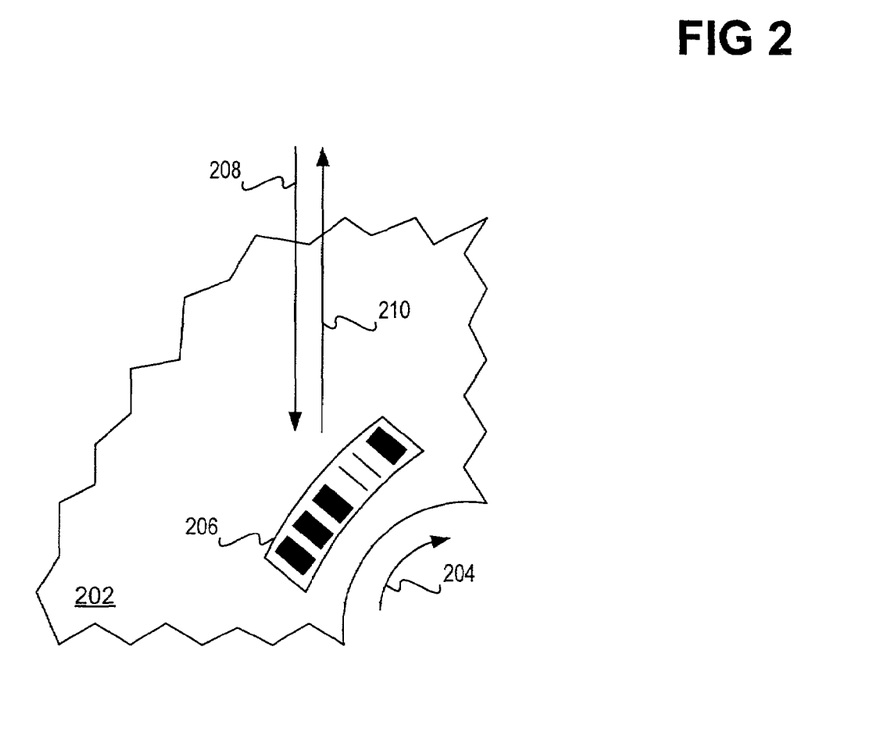
FIG. 2 is a diagram showing illustratively the performance of the method of FIG. 1, according to an embodiment of the invention.

FIG. 2 shows illustratively the performance of the method 100 in one embodiment of the invention. A portion of an optical disc 202 is shown in FIG. 2, where the optical disc 202 is rotating as indicated by the arrow 204. An indicia 206 is located on the inside border of the optical disc 202. The indicia 206 is shown larger than what its size will typically be for illustrative clarity. Furthermore, the indicia 206 may be located at positions other than the inside border of the optical disc 202. As shown in FIG. 2, the indicia 206 is a one-dimensional bar code, but other types of indicia may also be used, such as other types of encoded data formats, such as two-dimensional bar codes, and so on. Two-dimensional bar codes include those known as PDF417, MaxiCode, and Data-Matrix, among others.

A laser emits a signal 208, which is reflected by the indicia 206 as the reflected signal 210. The signal 208 has a sufficiently low intensity so that it does not cause writing to the disc 202. The reflected signal 210 is then sensed. The emission of the signal 208 and the sensing of the reflected signal 210 serve two purposes. First, the emission and sensing enable the indicia 206 to be detected. Second, the emission and sensing enable the information encoded in the indicia 206 to be read, so that, for instance, properties regarding the optical disc can be identified. Different bar code patterns may be used to encode different types of information within the indicia 206.

Write Protection Embodiment

Figure 3:
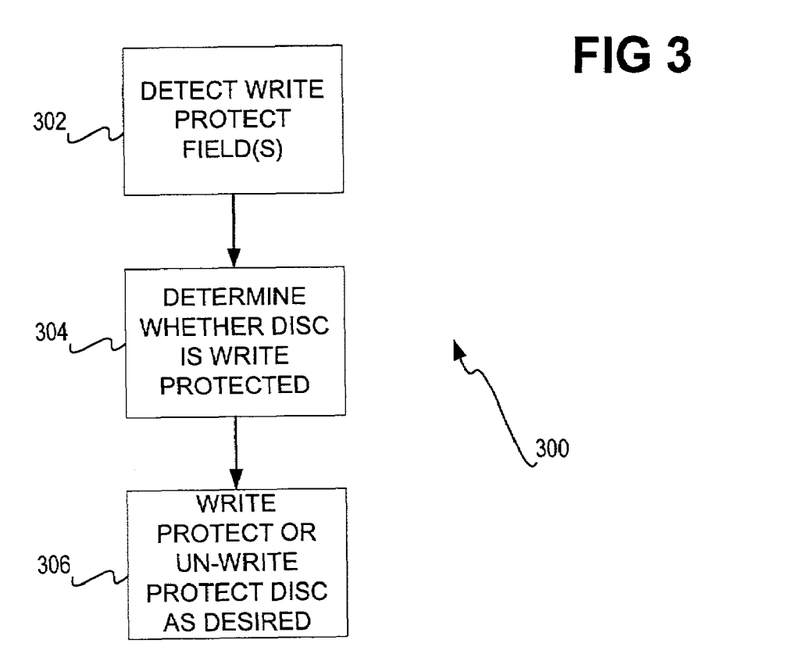
FIG. 3 is a flowchart of a method according to a write-protect embodiment of the invention.

FIG. 3 shows a method 300 according to a write protect embodiment of the invention. The method 300 can be used in conjunction with the method 100 of FIG. 1. At least one write-protect field previously laser-written on a label side of an optical disc is first detected (302). As in the method 100, the write-protect field(s) are detected by moving a laser radially across a position on the side of the optical disc, as the disc rotates, where the write-protect field(s) are located at this position.

Based on the write-protect field(s) detected, the method 300 determines whether the optical disc is write protected (304). The method 300 may conclude that the label side, the data side, or both the label and the data sides of the optical disc are write protected. There may be a series of write-protect fields, where the last write-protect field detected is that which indicates the write-protected status of the optical disc. Thus, to write protect an un-write-protected disc, or to un-write protect a write-protected disc, as desired, an appropriate new write-protect field can be written after the current last write-protect field in the series of write-protect fields (306). Where there is only a single write-protect field, and where there is no allowance for writing additional write-protect fields, once the optical disc is write protected, it cannot be un-write protected.

Figure 4:
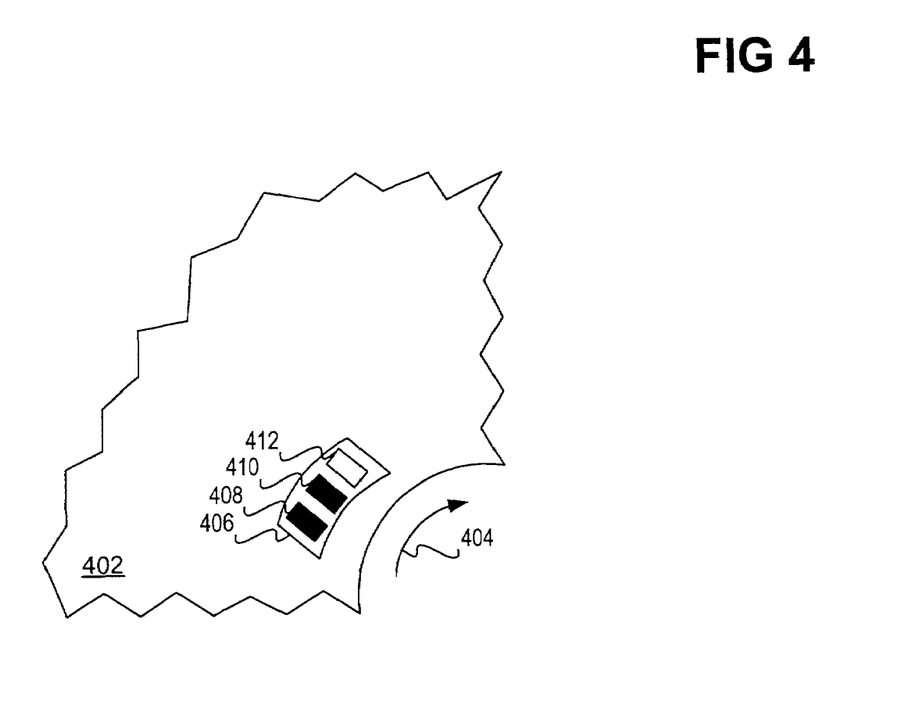
FIG. 4 is a diagram showing illustratively the performance of the method of FIG. 3, according to an embodiment of the invention.

FIG. 4 shows illustratively the performance of the method 300 in one embodiment of the invention. A portion of an optical disc 402 is shown in FIG. 4, where the optical disc 402 is rotating as indicated by the arrow 404. A series of write-protect fields 406 is located on the inside border of the optical disc 402. The series 406 is shown larger than what its size will typically be for illustrative clarity. Furthermore, the series 406 may be located at positions other than the inside border of the optical disc 402. Where the method 300 is performed in conjunction with the method 100, the series 406 may be part of the indicia 206 of FIG. 2 that has been described.

A laser performs reading from and writing to the optical disc 402 in FIG. 4, although the signals emitted by the laser and reflected from the optical disc 402 are not shown in FIG. 4 for illustrative clarity. An emitted signal having a sufficiently low intensity is used to read the series of write-protect fields 406 from the optical disc 402. The sufficiently low intensity is such that writing to the optical disc 402 does not occur. The write-protect fields 406 reflect the signal, and this reflected signal is used to read the fields 406. By comparison, an emitted signal with sufficiently high intensity is used to write to the optical disc 402. The sufficiently high intensity is such that writing to the optical disc 402 occurs.

As shown in FIG. 4, there are three write-protect fields 408, 410, and 412. This series of write-protect fields 406 is read, where the last write-protect field 412 is determinative as to the write-protected status of the optical disc 402. Shaded write-protect fields, such as the fields 408 and 410, indicate that the optical disc 402 is write protected, whereas unshaded write-protect fields, such as the field 412, indicate that the optical disc 402 is not write protected. Because the last write-protect field 412 is unshaded, this means that the optical disc 402 is not write protected.

To subsequently write protect the optical disc 402, the write-protect field 412 would be written by a laser so that it is shaded, or a new write-protect field that is shaded would be written after the write-protect field 412, but still part of the series 406. This process is repeated each time the status of the write protection of the optical disc 402 is desired to be changed. That is, where the optical disc 402 is currently un-write protected, its current write-protect field is written to by a laser to be shaded, or a new, shaded write protect field is written. Where the optical disc 402 is currently write protected, a new, unshaded write protect field is written.

Signal-Reflecting Embodiment

Figure 5:
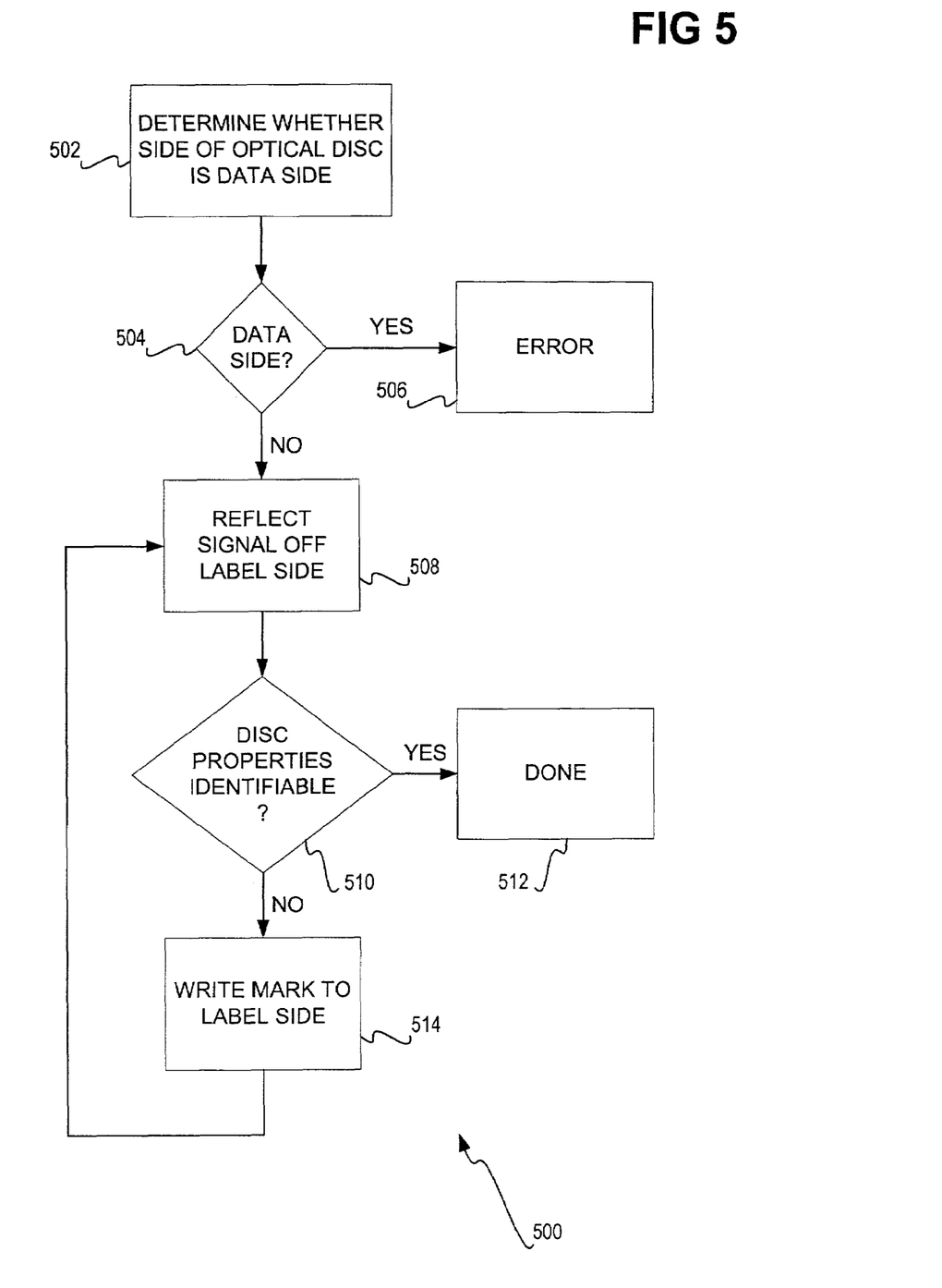
FIG. 5 is a flowchart of a method according to a signal-reflecting embodiment of the invention.

FIG. 5 shows a method 500 according to a signal-reflecting embodiment of the invention. The method 500 can be used where there is no indicia for the method 100 of FIG. 1 to detect. The method 500 first determines whether a side of an optical disc that faces a laser is the data side of the disc (502). This can be accomplished by emitting a signal by the laser and sensing the signal as reflected by the disc. More particularly, pits and grooves associated with a data side of the disc are detected on the side of the optical disc that faces the laser, or data tracks associated with a data side of the disc are detected on the side of the optical disc that faces the laser. If the method 500 determines that the data side of the disc faces the laser (504), then an error is reported (506), because properties regarding the label side of the optical disc cannot be identified.

Where the method 500 determines that the label side of the optical disc faces the laser, however, then a signal emitted by the laser is reflected off the label side off the disc (508). With some types of optical disc media, reflecting a signal off the label side of the optical disc is sufficient to identify properties of the label side of the optical disc, based on the signal as reflected. For instance, ¢ different types of optical discs may reflect signals off their label sides in different ways sufficient to identify the properties of their label sides. Sensing the reflected signal is encompassed under the phrase reading information from the optical disc. If the optical disc properties are identifiable (510), then the method 500 is finished (512), having successfully identified the properties of the label side of the disc.

Where the method 500 cannot identify the properties of the label side of the optical disc, however, then it writes a mark to the label side of the optical disc (514). This mark may be a pixel written sufficiently small to escape casual detection by the user, and/or may be written in the disc's border, where it is not likely to detract from any image written to the label side of the optical disc. The method 500 then partially repeats, again reflecting a signal off the label side of the disc (508). However, this time the signal is specifically reflected off the mark that was written. The mark is written so that the properties of the label side of the optical disc are more easily identified when a signal is reflected off the mark. Thus, if the disc properties are identifiable (510), then the method ends (512). Otherwise, a different mark is written (514), and the process is repeated.

For instance, the mark that is written in 514 may be associated with a particular type of optical disc, which has associated therewith a particular reference reflected signal. The particular type of optical disc can include different types of optical disc media, such as monochrome, gray scale, color, rewritable, and so on, as well as different types of optical disc formats, such as compact disc (CD), digital versatile disc (DVD), and so on. If the signal reflected off this mark in 508 matches within a threshold the reference signal, then the method 500 concludes that the optical disc to which the mark was written is this particular type of optical disc, and the disc's label side properties are readily identifiable in 510. This process can be repeated for a number of different types of marks, corresponding to a number of different types of optical disc having a number of particular types of references signals, until a matching reflected signal identifies the properties of the optical disc under investigation.

Figure 6:
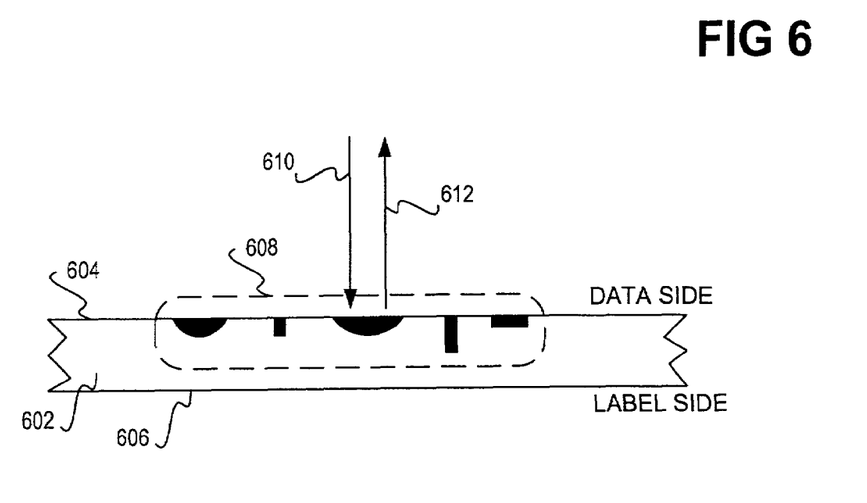
FIG. 6 is a diagram showing illustratively the performance of part of the method of FIG. 5, according to an embodiment of the invention.

FIG. 6 shows illustratively the performance of 502 of the method 500 in one embodiment of the invention. The side profile of an optical disc 602 is shown. The optical disc 602 has a data side 604 and a label side 606. The data side 604 faces the laser, which is not specifically shown in FIG. 6. The data side 604 has a number of pits and grooves 608 that are associated with data sides of optical discs, and that identify the data tracks of or the data that has been written to such optical discs. A signal 610 emitted by the laser is reflected off these pits and grooves 608 as the reflected signal 612. The reflected signal 612 is then used to detect the pits and grooves 608, and thus to conclude that the data side 604 of the optical disc 602 faces the laser.

Figure 7:
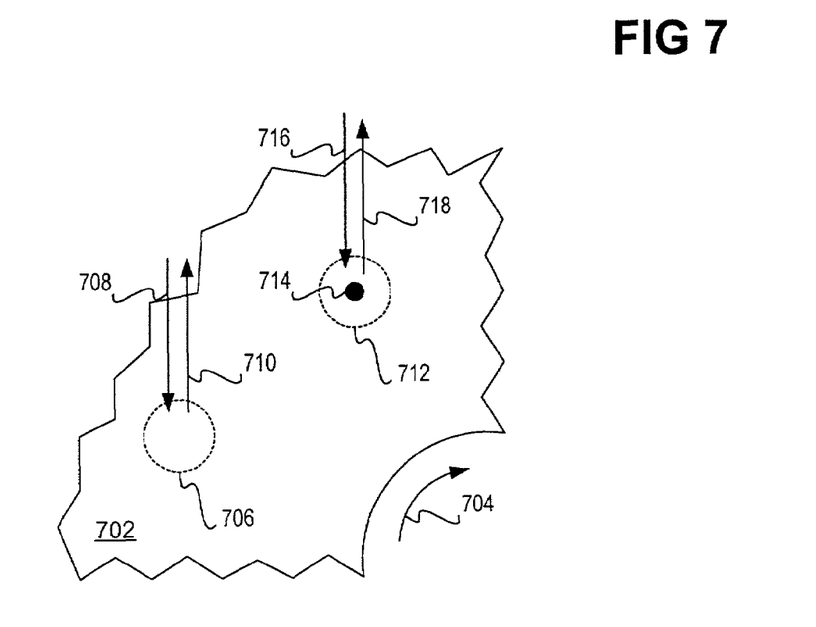
FIG. 7 is a diagram showing illustratively the performance of another part of the method of FIG. 5, according to an embodiment of the invention.

FIG. 7 shows illustratively the performance of 508 of the method 500 in one embodiment of the invention. A portion of an optical disc 702 is shown in FIG. 7, where the optical disc 702 is rotating as indicated by the arrow 704. Initially, a laser emits a signal 708 off a position 706 on the optical disc 702 to which a mark has not been written. The position 706 is shown in FIG. 7 larger than it typically will be for illustrative clarity, and the position 706 may be elsewhere on the optical disc 702 than is depicted in FIG. 7. The signal 710 is reflected off this position 706, and is used to determine whether the properties of the label side of the optical disc 702 can be identified.

Where the label side properties of the optical disc 702 cannot be so identified, a mark 714 is written to the position 712 on the optical disc 702, using the laser. Both the mark 714 and the position 712 are shown in FIG. 7 larger than they typically will be for illustrative clarity. Furthermore, the position 712 may be elsewhere on the optical disc 702 than is depicted in FIG. 7. The laser emits the signal 716 off the mark 714 at the position 712, and the signal 718 is reflected off the mark 714. The reflected signal 718 is then used to determine whether the properties of the label side of the optical disc 702 can be identified, as has been described. Where the label side properties are still not identifiable, a number of other marks may be written and signals reflected thereby until the label side properties are identified.

Integrated Method

Figure 8:
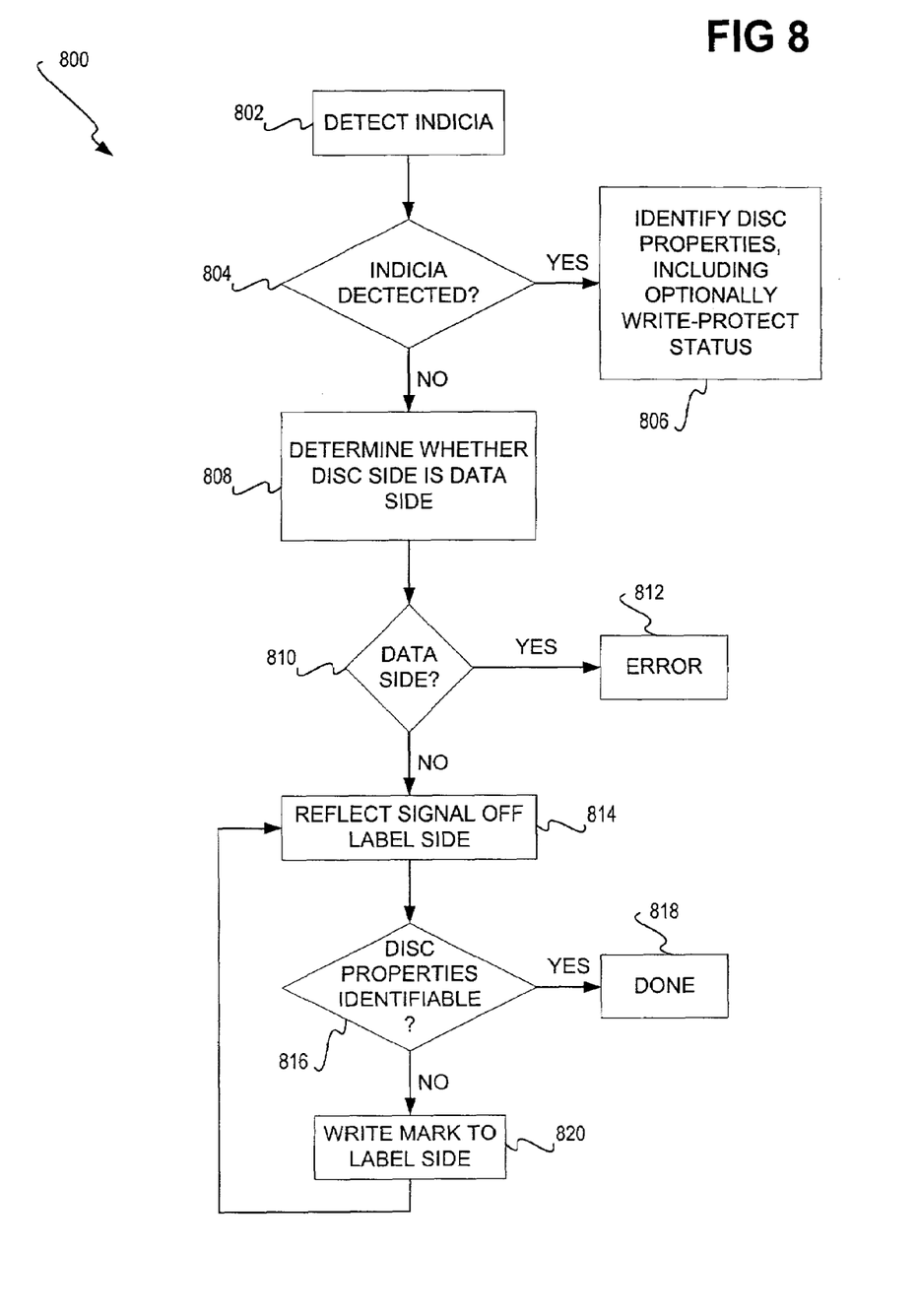
FIG. 8 is a flowchart of a method that integrates the methods of FIGS. 1, 3, and 5, according to an embodiment of the invention.

FIG. 8 shows a method 800 that integrates the methods 100, 300, and 500, of FIGS. 1, 3, and 5, respectively, according to an embodiment of the invention. Other methods that integrate the methods 100, 300, and 500, other than the method 800 of FIG. 8, are also possible. First, indicia on what is presumed to be the label side of an optical disc is attempted to be detected using a laser (802). If the indicia is detected (804), then properties of the optical disc, including optionally the disc's write-protect status, are identified (806), and the method 800 is finished.

Otherwise, the method 800 determines whether the side of the optical disc facing the laser is its data side (808), which is one reason why indicia may not have been detected in 802. The other reason why indicia may not have been detected in 802 is that no such indicia is written on the label side of the optical disc. If the side facing the laser is the data side of the disc (810), then an error is reported (812). However, if this side of the disc is not the data side, then this means that the label side of the optical disc faces the laser, but no indicia is written on the label side.

Therefore, a signal is reflected off the label side of the optical disc (814), to identify the properties of the optical disc. If such properties are identifiable by only reflecting the signal off the disc's label side (816), then the method 800 is finished (818). Otherwise, the method 800 writes a mark to the label side of the disc (820), and the method 800 is repeated at 814. That is, a signal is reflected off the label disc of the disc where the mark was written, and so on, until the properties of the label side of the optical disc are ultimately identified.

System

Figure 9:
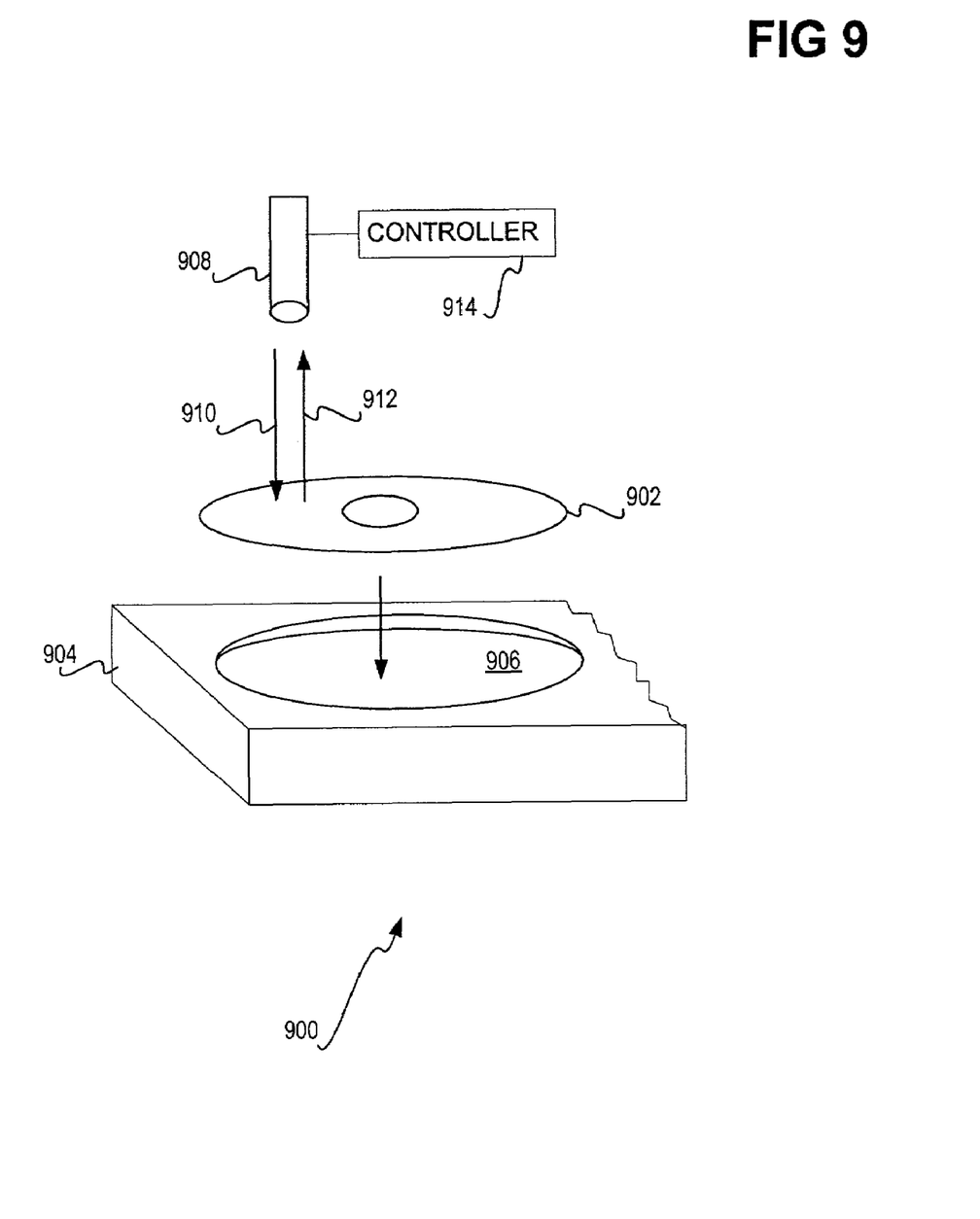
FIG. 9 is a diagram of a system according to an embodiment of the invention.

FIG. 9 shows a system 900 according to an embodiment of the invention. The methods that have been described can be implemented in conjunction with the system 900. The system 900 includes a mechanism 904 having a seat 906 in which the optical disc 902 can rotatably rest. The mechanism 904 is generally receptive to the optical disc 902, and may include motors and other components not shown in FIG. 9. The mechanism 904 is depicted in FIG. 9 as a tray, but may also be such that the optical disc 902 is fed or inserted directly thereinto, instead of being placed on a tray.

The system 900 also includes a laser 908. The laser 908 emits signals 910 and senses signals 912 reflected by the optical disc 902 as the disc 902 rotates in the mechanism 904. As such, the laser 908 and/or the system 900 may include a sensor to sense or detect the signals 912 reflected by the optical disc 902. The laser 908 thus is for reading information from and/or writing information to the optical disc 902, such as the label side of the optical disc 902.

The system 900 also includes a controller 914. The controller 914 may be software, hardware, or a combination of software and hardware. The controller 914 controls the laser 908. The controller 914 is able to identify properties of the label side of the optical disc 902 from the information read by the laser 908. The controller 914 can also direct the laser 908 to write to the optical disc 902, such as to write protect the disc 902, to write a mark on the disc 902, and so on.

Figure 10:
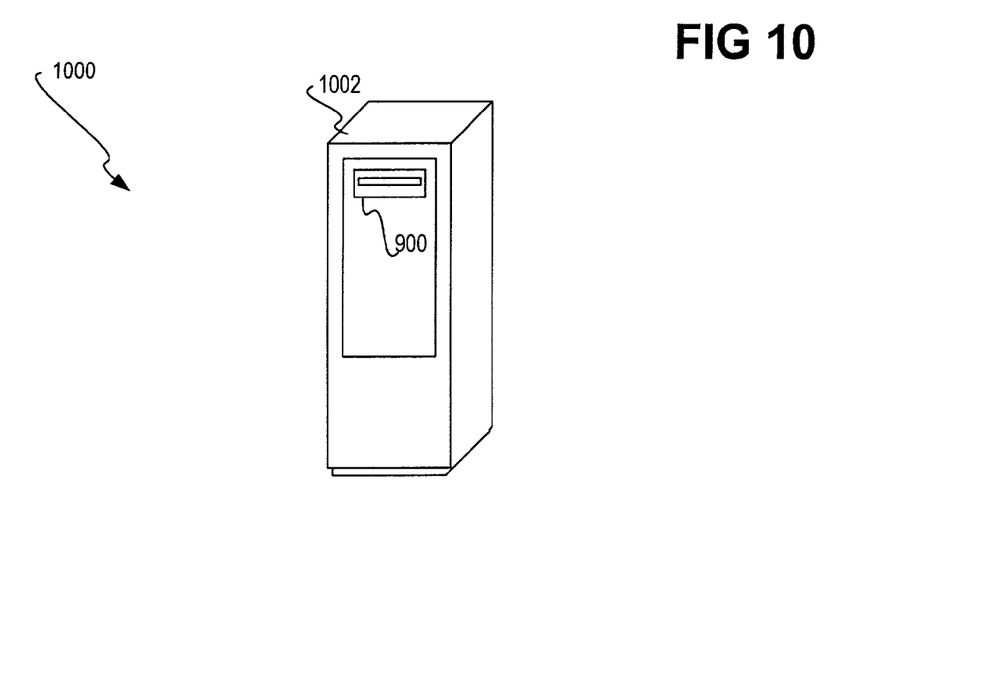
FIG. 10 is a diagram showing how an embodiment of the invention can be internally adapted to a computer.
Figure 11:
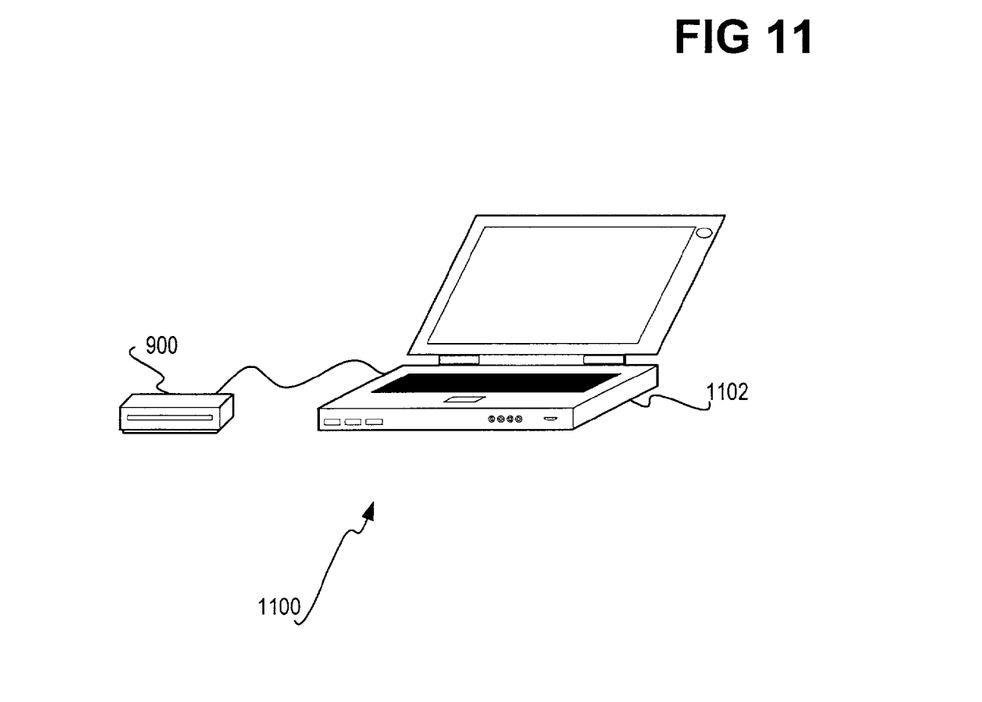
FIG. 11 is a diagram showing how an embodiment of the invention can be externally adapted to a computer.

The system 900 may be part of a computer, such as a desktop or laptop computer. The system 900 may also be encased in an enclosure internally or externally connectable to a computer. FIG. 10 shows a system 1000 according to an embodiment of the invention that includes a desktop tower computer 1002 in which the system 900 is encased in an enclosure that has been internally connected to the computer 1002. By comparison, FIG. 11 shows a system 1100 according to an embodiment of the invention that includes a laptop computer 1102 in which the system 900 is enclosed in an enclosure that has been externally connected to the computer 1102. Whereas the computer 1102 is depicted in FIG. 11 as a laptop computer, it may also be a desktop computer, or another type of computer.

Computer Program

Figure 12:
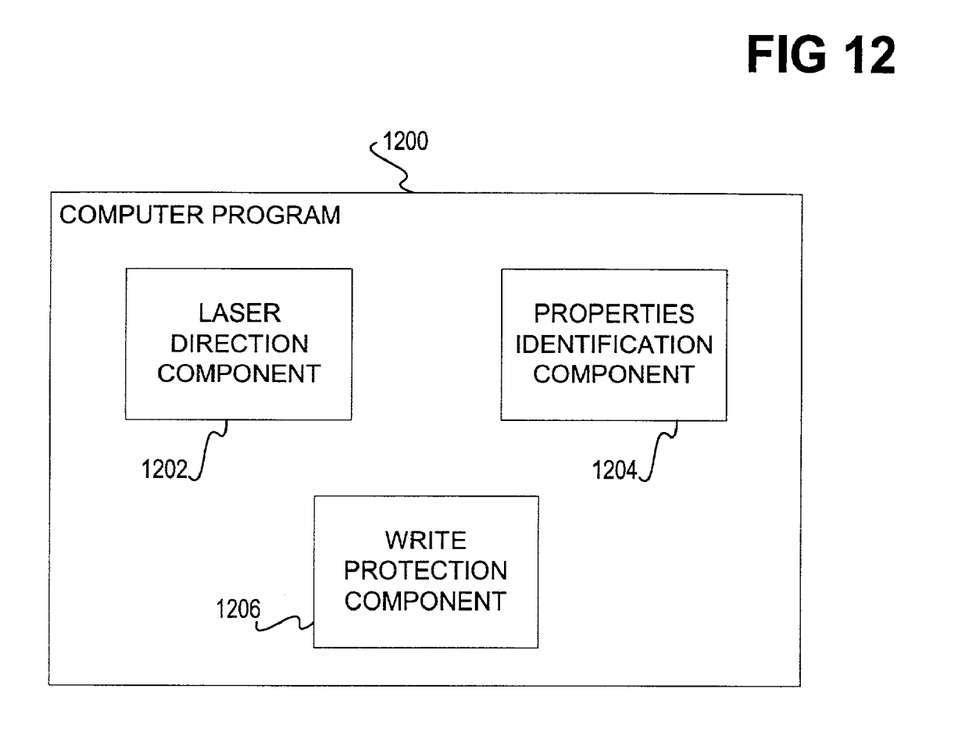
FIG. 12 is a diagram of a computer program according to an embodiment of the invention.

FIG. 12 shows a computer program 1200 according to an embodiment of the invention. The methods that have been described can be implemented in conjunction with the computer program 1200. Furthermore, the computer program 1200 may be used to control the system 900 of FIG. 9, where the program 1200 may reside within the controller 914 of FIG. 9. For example, the program 1200 may reside within firmware of the system 900 of FIG. 9, as part of or different than the controller 914 of FIG. 9. The computer program 1200 may be stored on a computer-readable medium, such as a floppy disk, an optical disc such as a CD-ROM, and so on.

The computer program 1200 is depicted in FIG. 12 as including three components 1202, 1204, and 1206. Each of these components may be implemented as a separate set of computer-executable instructions, module, set of routines, and so on. However, the components are discretely shown in FIG. 12 for illustrative clarity. Therefore, their individual functionality may be combined into one or more other components, or distributed among a different set of components as well. Each component may also be considered the means for performing its respective functionality.

The laser direction component 1202 directs a laser to read information from or write information to the label side of a rotating optical disc. The properties identification component 1204 identifies properties of the optical information from information read by the laser using the laser direction component 1202. The write protection component 1206 write protects the optical disc by instructing the laser direction component 1202 to set a write-protect field on the label side of the disc.

CONCLUSION

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A method comprising:
    reading a signal as reflected by a label side of an optical disc, without reading any indicia on the label side of the optical disc, an indicia defined as data encoded within an encoded data format;
    attempting to identify one or more properties of the optical disc from the signal reflected by the label side of the optical disc;
    where the one or more properties cannot be identified from the signal reflected by the label side of the optical disc,
        writing a mark to the label side of the optical disc, the mark being one of a pixel written sufficiently small to escape casual detection by a user and a mark written to a border of the label side of the optical disc;
        reading a second signal reflected by the mark written to the label side of the optical disc; and,
        identifying the one or more properties of the optical disc from the second signal reflected by the mark written to the label side of the optical disc.

2. A method comprising:
    reflecting a signal off a side of an optical disc initially presumed to be a label side of the optical disc with a laser, without reading any indicia on the label side of the optical disc, an indicia defined as data encoded within an encoded data format;
    attempting to identify properties of a label side of the optical disc based on the signal, where the side of the optical disc is the marking or imaging surface of the optical disc;
    where the one or more properties cannot be identified from the signal reflected by the label side of the optical disc,
        writing a mark to the label side of the optical disc, the mark being one of a pixel written sufficiently small to escape casual detection by a user and a mark written to a border of the label side of the optical disc;
        reading a second signal reflected by the mark written to the label side of the optical disc; and,
        identifying the one or more properties of the optical disc from the second signal reflected by the mark written to the label side of the optical disc.

3. The method of claim 2, further initially comprising:
    determining whether the side of the optical disc is the data side; and,
    in response to determining that the side of the optical disc is other than the data side, proceeding with reflecting the signal off the side of the optical disc.

4. The method of claim 3, wherein determining whether the side of the optical disc is the data side comprises detecting pits and grooves on the side of the optical disc associated with the data side.

5. The method of claim 3, wherein determining whether the side of the optical disc is the data side comprises detecting data tracks on the side of the optical disc.

6. A system comprising:
    a mechanism receptive to an optical disc and in which the optical disc is rotatable;
    a laser to at least detect a signal reflected by a label side of the optical disc without reading any indicia on the label side of the optical disc, an indicia defined as data encoded within an encoded data format; and,
    a controller to at least attempt to identify one or more properties of the label side of the optical disc from the signal detected by the laser,
    wherein where the controller is unable to identify the one or more properties from the signal reflected by the label side of the optical disc,
        the controller is to direct the laser to write a mark to the label side of the optical disc, the mark being one of a pixel written sufficiently small to escape casual detection by a user and a mark written to a border of the label side of the optical disc,
        the laser is to read a second signal reflected by the mark written to the label side of the optical disc; and,
        the controller is to identify the one or more properties of the optical disc from the second signal reflected by the mark written to the label side of the optical disc.

7. The system of claim 6, wherein the properties of the label side of the optical disc comprise properties for writing on the label side of the optical disc with the laser.

8. The system of claim 6, wherein the label side of the optical disc includes no indicia written thereto.

9. The system of claim 6, wherein the laser is further to write information to the label side of the optical disc.

10. The system of claim 6, wherein the mechanism, the laser, and the controller are encased in an enclosure internally connectable to a computer.

11. The system of claim 6, wherein the mechanism, the laser, and the controller are encased in an enclosure externally connectable to a computer.

12. The system of claim 6, wherein the mechanism, the laser, and the controller are part of a computer.

13. A computer-readable medium having a computer program stored thereon comprising:
- first means for directing a laser to at least detect a signal reflected by a label side of a rotating optical disc without reading any indicia on the label side of the rotating optical disc, an indicia defined as data encoded within an encoded data format; and,
- second means for attempting to identify one or more properties of the label side of the rotating optical disc from the signal reflected by the laser,
- wherein where the second means is unable to identify the one or more properties from the signal reflected by the label side of the optical disc,
- the first means is to direct the laser to write a mark to the label side of the optical disc, the mark being one of a pixel written sufficiently small to escape casual detection by a user and a mark written to a border of the label side of the optical disc,
- the laser is to read a second signal reflected by the mark written to the label side of the optical disc; and,
- the second means is to identify the one or more properties of the optical disc from the second signal reflected by the mark written to the label side of the optical disc.

14. The medium of claim 13, wherein the means for directing the laser is further for directing the laser to write information to the label side of the rotating optical disc.

* * * * *